United States Patent [19]

Liddle

[11] 3,998,643
[45] Dec. 21, 1976

[54] COMPOSITION AND METHODS FOR PROTECTING AND RENDERING NON-POROUS SURFACES WATER AND SOIL REPELLENT

[75] Inventor: Raymond Liddle, Waterford, N.Y.

[73] Assignee: General Electric Company, Waterford, N.Y.

[22] Filed: Mar. 31, 1975

[21] Appl. No.: 563,310

[52] U.S. Cl. .............................. 106/2; 106/287 SB; 428/321; 428/429; 428/447; 428/450
[51] Int. Cl.² ........................................ C09K 3/18
[58] Field of Search ................ 106/287, 2, 287 SB; 428/321, 447, 429, 450; 260/29.2 M, 29.1 SB, 29.29; 252/142; 429/429

[56] References Cited
UNITED STATES PATENTS

| | | | |
|---|---|---|---|
| 3,310,417 | 3/1967 | Lerner et al. | 260/29.2 M |
| 3,451,964 | 6/1969 | Creamer | 260/46.5 G |
| 3,578,488 | 5/1971 | Ohlhausen | 260/31.2 |
| 3,579,540 | 5/1971 | Ohlhausen | 260/33.4 |
| 3,619,281 | 11/1971 | Dresden | 260/29.2 M |

Primary Examiner—Theodore Morris
Attorney, Agent, or Firm—Donald J. Voss; Edward A. Hedman; Rocco S. Barrese

[57] ABSTRACT

Water and soil repellent compositions comprising the product of the admixture of an alkylpolysiloxane, a mineral acid selected from the group consisting of sulfuric acid, phosphoric acid, aromatic sulfonic acids, aliphatic sulfonic acids and hydrochloric acid, and hydrofluoric acid are provided. Methods for preparing the same and for protecting and rendering non-porous surfaces water and soil repellent employing the same are also provided.

40 Claims, No Drawings

COMPOSITION AND METHODS FOR PROTECTING AND RENDERING NON-POROUS SURFACES WATER AND SOIL REPELLENT

BACKGROUND OF THE INVENTION

This invention relates to water and soil repellent compositions and more particularly to water and soil repellent compositions for treating non-porous surfaces.

There is frequently a need to treat a non-porous surface to render the same water or soil repellent. Thus, the effective life, appearance and performance of objects made of such materials as glass, ceramics, metal and plastics, etc., are often adversely affected and degraded by the wetting action of water and foreign particles carried by water. Other adverse effects resulting from the wetting of such substrates by water are impairment of vision, soiling, staining, corrosion, alteration of electrical properties, loss of luster, etc.

The presently available materials for treating non-porous substrates are frequently unsatisfactory and difficult to use for a number of reasons, such as: they are usually effective on only one, or at the most a few, of the surfaces encountered; they may require the use of specialized storage and application techniques; they may require careful timing to prevent difficulty of rub-out or streaking of the surfaces being treated; they may require heat curing which cannot be carried out under many actual field application conditions; they may require extensive surface preparation prior to application; and, most importantly, they usually lack durability and resistance to solvents and detergents and thus require frequent reapplication to maintain the substrate in a water-repellent condition.

U.S. Pat. No. 3,579,540, dated May 18, 1971, discloses a water repellent composition useful for the treatment of non-porous surfaces such as glass, said composition consisting essentially of an alkyl polysiloxane, a mineral acid such as sulfuric acid, and a solvent. While these compositions are satisfactory to some extent, a need still exists for improved water and soil repellency and improved durability.

SUMMARY OF THE INVENTION

Accordingly, it is one object of the present invention to provide a novel water and soil repellent composition useful in the treatment of a great variety of non-porous substrates.

Another object of this invention is to provide an improved water and soil repellent composition which, in addition to being characterized with the advantages of prior art compositions, is further characterized with improved water and soil repellency and improved durability.

Still another object of the present invention is to provide a novel and improved method to protect and render non-porous surfaces water and soil repellent.

A still further object of this invention is to provide a novel method for the preparation of the novel and improved water and soil repellent composition of this invention.

These and other objects are achieved herein by providing a water and soil repellent composition comprising the product resulting from the admixture of an alkyl polysiloxane, a mineral acid selected from the group consisting of sulfuric acid, phosphoric acid, aromatic sulfonic acids, aliphatic sulfonic acids and hydrochloric acid, and hydrofluoric acid.

DETAILED DESCRIPTION OF THE INVENTION

In accordance with the present invention, improved water and soil repellent compositions are prepared by admixing an alkyl polysiloxane with a mineral acid and hydrofluoric acid.

Suitable alkyl polysiloxanes used in accordance with this invention have the general formula:

in which $n$ is an integer greater than 1, $R_1$ is a lower alkyl radical containing from 1–7 carbon atoms, and $R_2$ is either a hydrogen, a lower alkyl radical containing from 1–7 carbon atoms, or an aryl radical containing 6 carbon atoms. Examples of suitable alkylpolysiloxanes include a dimethyl polysiloxane, like trimethylsiloxy chain-stopped dimethylpolysiloxane, methyl hydrogen polysiloxane, and methyl phenyl polysiloxane, etc. These alkyl polysiloxanes are commercially available in various molecular weight ranges. Although the particular species of the alkyl polysiloxane and its molecular weight most suited for a particular application must be determined from each set of circumstances, generally a value for $n$ of about 5–900 is preferred. For example, a molecular weight range corresponding to a viscosity range of from about 2.5 to about 10,000 centistokes at 25° C is desirable. Blends of the afore-described alkylpolysiloxanes are also encompassed herein, including blends of different alkylpolysiloxanes, such as dimethylpolysiloxane and methylphenylsiloxane or blends of the same alkyl polysiloxanes but of different viscosities, such as different viscosity dimethylpolysiloxanes.

Among the suitable mineral acids which are encompassed by the present invention are included sulfuric acid, phosphoric acid, aromatic sulfonic acids, aliphatic sulfonic acids and hydrochloric acid. Concentrated sulfuric acid is preferred.

The hydrofluoric acid used herein may be any commercially available material. Generally, for the purposes of this invention, concentrated (i.e., about 48%) hydrofluoric acid is preferred, although more diluted forms may be used.

The amounts of the individual components which make up the compositions of the present invention may vary within a wide range. In general, however, the aforedescribed mineral acids, such as sulfuric acid, are employed in amounts ranging from about 1.0 to about 30%, based on the weight of the alkyl polysiloxane. When an extremely small amount of alkyl polysiloxane is used in the composition, like 2% by weight, then the relative amount of mineral acid required would be somewhat greater than indicated above, such as, for example, amounts ranging up to 50% by weight, based on the alkylpolysiloxane used. Preferably, the amount of mineral acid employed for the purposes of this invention is from about 1.5 to about 20%, based on the weight of the alkyl polysiloxane.

For the purposes of this invention, the hydrofluoric acid is utilized in amounts ranging from about 0.3% to about 10%, based on the weight of the alkyl polysiloxane. When very small amounts of alkyl polysiloxane are used, however, amounts up to about 30% of the hydrofluoric acid may be employed.

The water and soil repellent compositions of this invention may be prepared in various ways. For example, all the ingredients may be added together in any order and thoroughly agitated at ambient conditions.

Another manner in which the compositions of this invention may be prepared involves the admixture of the afore-described ingredients with an appropriate solvent, diluent and/or extender at ambient conditions. The use of such solvents, diluents and/or extenders aids in the application of compositions to the particular substrate desired, as well as permits less use of the more expensive alkyl polysiloxane and makes the handling of the composition safer. The alkyl polysiloxane fluid, mineral acid and hydrofluoric acid may be mixed together first and then mixed with the solvent, or all the ingredients may be mixed at once. Another method involves the addition of the mineral acid to the solvent first and then mixing the resultant mixture with the alkylpolysiloxane and hydrofluoric acid.

The solvents, diluents and/or extenders which are suitable for use herein include alcohols, chlorinated hydrocarbons, ethers, ketones, esters, aromatic hydrocarbons, water, colloidal pyrogenic silicas and clays. More specifically, examples of such solvents, diluents and extenders are benzene, butyl acetate, carbon tetrachloride, ethyl ether, gasoline, hexane, isopropyl alcohol, methyl ethyl ketone, mineral spirits, perchloroethylene, toluene, xylene, pentane, and the like. Isopropyl alcohol is preferred.

The amount of solvent, diluent and/or extender used can also vary within a wide range. Generally, for the purposes of this invention, such as for treatment of glass, the solvent, diluent and/or extender can be used in amounts varying from about 75 to about 96% by weight of the final composition. Preferably, the solvent, diluent and/or extender is used in amounts of from about 90 to 95% by weight of the final composition.

A preferred method to prepare the water and soil repellent compositions of this invention involves the initial addition of all or part of the solvent such as isopropyl alcohol to the appropriate alkyl polysiloxane and agitation of the mixture. The hydrofluoric acid and mineral acid, such as sulfuric acid, are then added to this mixture and thoroughly mixed. Remaining solvent, if any, is then added thereto.

It should be understood herein that the water and soil repellent compositions of the present invention are complex formulations. That is, they are comprised not only of the alkylpolysiloxane, mineral acid and hydrofluoric acid, but also of ingredients resulting from the chemical interreaction of these materials. The precise nature of the materials resulting from the chemical interreaction is not known and is obviously extremely difficult to ascertain.

The compositions of the present invention can be applied to the non-porous substrate by any conventional means, such as by spraying, brushing, wiping and other coating techniques. To insure complete coverage of the substrate, it is preferred to lightly wipe the coated surface with a cloth after the composition is applied. To obtain a surface with an optically clear film coated thereon, excess treating material can be removed by wiping with a dry cloth. The treated surface can be polished to obtain a high degree of luster.

The method of treating non-porous substrates according to the present invention is extremely useful for a variety of purposes. For example, the windshields of automobiles, boats and airplanes can be treated by the method of the present invention to render the same water repellent and thus by preventing wetting, will present a clear view of the road to a driver without the use of conventional windshield wipers even during a heavy rainstorm. This is particularly advantageous in the case of inoperative windshield wipers and side and rear windows through which vision is usually impaired and restricted during a rainstorm. Windshields coated with a composition of the present invention can also be more easily cleaned of various dirt and foreign materials than windshields not so treated. Thus, it is common knowledge that after a long distance trip, the front windshields are almost invariably soiled by dirt, grease, bugs, etc, which are extremely difficult to completely remove. It is found that after the windshield of an automobile has been treated in accordance with the present process before a long distance trip, such dirt and bugs can be substantially completely removed simply by the use of a standard windshield washer and wiper. This is because the polysiloxane-treated windshield presents a surface on which foreign material does not strongly adhere.

Another example of the utility of the present invention resides in the treating of automobile windows in the winter months. When windows which have been treated in accordance with the method of the present invention are left outdoors over night, the frost and ice gathered on the windows can be more easily removed by conventional techniques than from untreated surfaces.

Other uses of the method and composition of the invention include the treating of glass, metal and ceramic exterior surfaces of buildings and other objects, such as storm doors, ceramic sinks, and tiles, front panels of appliances, plastic tiles and vinyl floor coverings. Such treatment maintains the attractive appearance of such surfaces, protects such surfaces against corrosion, and renders the surfaces easier to clean.

In order that those skilled in the art may better understand how the present invention may be practiced, the following examples are given by way of illustration and not by way of limitation.

EXAMPLE 1

8.0 parts by weight of a dimethyl polysiloxane blend (8.0% by weight of the total composition) having a blend viscosity of from about 8–10 centistokes at 25° C comprising 30% by weight of trimethylsiloxy chain-stopped dimethylpolysiloxane (m.w. about 800, viscosity 5 centistokes at 25° C), 60% by weight of trimethylsiloxy chain-stopped dimethylpolysiloxane (m.w. about 1500, viscosity 20 centistokes at 25° C) and 10% by weight trimethylsiloxy chain-stopped dimethyl polysiloxane (m.w. about 3,000, viscosity 50 centistokes at 25° C) is thoroughly mixed for about 10 minutes with 0.16 parts by weight (86%) of concentrated sulfuric acid (0.16% by weight of the total composition), 0.04 parts by weight of concentrated (48%) hydrofluoric acid (0.04% by weight of the total composition) and 91.8 parts by weight anhydrous isopropyl alcohol (91.8% by weight of the total composition). The resultant composition is a clear liquid.

The above prepared repellent composition is applied to the glass window (clear and dry) on several cars by saturating a small folded cloth (soaking but not dripping) with the composition and wiping the entire area to be treated, using circular motion. The solvent is permitted to evaporate for about one minute. Using a clean soft cloth or tissue, excess repellent composition is wiped off so the glass is clear and haze-free.

Evaluations made after driving in the rain showed improved visibility in comparison to car glass windows which were left untreated and also which were treated with the same repellent composition except not containing hydrofluoric acid. The glass windows treated with the repellent composition containing the hydrofluoric acid had better repellency, and two months after application continued to show the best repellency. Although the glass under the windshield wiper blades loses some of its repellency, the composition of this invention employing the hydrofluoric acid is still more durable than the same composition without the hydrofluoric acid component.

EXAMPLE 2

8.0 parts by weight of a dimethyl polysiloxane blend having a viscosity of from about 8 to 10 centistokes at 25° C, comprising 30% by weight of trimethylsiloxy chain-stopped dimethyl polysiloxane (m.w. about 800, viscosity 5 centistokes at 25° C), 60% by weight of trimethylsiloxy chain-stopped dimethyl polysiloxane (m.w. about 1500, viscosity 20 centistokes at 25° C) and 10% by weight trimethylsiloxy chain-stopped dimethyl polysiloxane (m.w. about 3,000, viscosity 50 centistokes at 25° C) is thoroughly mixed with 91.8 parts by weight anhydrous isopropyl alcohol. To the resultant composition are added 0.16 parts by weight of concentrated (86%) sulfuric acid and 0.04 parts by weight of concentrated (48%) hydrofluoric acid. The resultant water and soil repellent composition is a clear liquid.

The above prepared repellent composition is applied to glass substrates in the same manner as is the composition of Example 1 and the water and soil repellency and durability shown by the composition is the same as in Example 2.

EXAMPLE 3

10 parts by weight of a dimethylpolysiloxane blend having a viscosity of from about 8 to 10 centistokes at 25° C, comprising 30% by weight of trimethylsiloxy chain-stopped dimethyl polysiloxane (m.w. about 800, viscosity 5 centistokes at 25° C), 60% by weight of trimethylsiloxy chain-stopped dimethyl polysiloxane (m.w. about 1500, viscosity 20 centistokes at 25° C) and 10% by weight trimethylsiloxy chain-stopped dimethyl polysiloxane (m.w. about 3,000, viscosity 50 centistokes at 25° C) is thoroughly mixed with 89.8 parts by weight anhydrous isopropyl alcohol. To the resultant composition are added 0.16 parts by weight of concentrated (86%) sulfuric acid and 0.04 parts by weight of concentrated (48%) hydrofluoric acid. The resultant water and soil repellent composition is a clear liquid.

The above prepared repellent composition is applied to glass substrates in the same manner as is the composition of Example 1 and the water and soil repellency and durability shown by the composition is the same as in Example 1.

Obviously, other modifications and variations of the present invention are possible in light of the above teachings. It is, therefore, to be understood that changes may be made in the particular embodiments of this invention which are within the full intended scope of the invention as defined by the appended claims.

What is claimed and desired to be secured by Letters Patent is:

1. A composition for treating non-porous substrates to protect and render the same water and soil repellent comprising the product resulting from the admixture of an alkyl polysiloxane fluid, an acid selected from the group consisting of sulfuric acid, phosphoric acid, an aromatic sulfonic acid, an aliphatic sulfonic acid and hydrochloric acid; and hydrofluoric acid.

2. The composition defined in claim 1 wherein said alkyl polysiloxane has the general formula

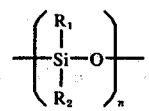

wherein $n$ is an integer greater than 1, $R_1$ is a lower alkyl radical containing from 1-7 carbon atoms, and $R_2$ is selected from the group consisting of hydrogen, a lower alkyl radical containing from 1 to 7 carbon atoms and an aryl radical.

3. The composition defined in claim 1 further comprising a solvent or diluent or extender.

4. The composition defined in claim 1 wherein said alkyl polysiloxane is selected from the group consisting of a dimethylpolysiloxane, a methylhydrogen polysiloxane, methyl phenylpolysiloxane and blends thereof.

5. The composition defined in claim 1 wherein said acid is sulfuric acid.

6. The composition as defined in claim 3 wherein said solvent, diluent or extender is isopropyl alcohol.

7. The composition as defined in claim 5 wherein said sulfuric acid is concentrated sulfuric acid.

8. The composition defined in claim 3 wherein said alkylpolysiloxane is a dimethylpolysiloxane fluid, said mineral acid is concentrated sulfuric acid, and said solvent is isopropyl alcohol.

9. The composition defined in claim 8 wherein said dimethylpolysiloxane is a blend of different viscosity dimethylpolysiloxanes.

10. A composition for treating non-porous substrates to protect and render the same water and soil repellent comprising an alkyl polysiloxane fluid, an acid selected from the group consisting of sulfuric acid, phosphoric acid, an aromatic sulfonic acid, an aliphatic sulfonic acid and hydrochloric acid; and hydrofluoric acid.

11. The composition defined in claim 10 wherein said alkyl polysiloxane has the general formula:

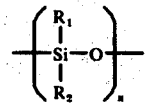

wherein $n$ is an integer greater than 1, $R_1$ is a lower alkyl radical containing from 1-7 carbon atoms, and $R_2$ is selected from the group consisting of hydrogen, a lower alkyl radical containing from 1-7 carbon atoms and an aryl radical.

12. The composition defined in claim 10 wherein said acid is sulfuric acid.

13. The composition defined in claim 10 further including a solvent or diluent or extender.

14. The composition defined in claim 12 wherein said sulfuric acid is concentrated sulfuric acid.

15. The composition defined in claim 13 wherein said solvent, diluent or extender is isopropyl alcohol.

16. The composition defined in claim 13 comprising a dimethylpolysiloxane, concentrated sulfuric acid, hydrofluoric acid and isopropyl alcohol.

17. The composition defined in claim 16 wherein said dimethylpolysiloxane is a blend of different viscosity dimethylpolysiloxanes.

18. A process for rendering a non-porous substrate water and soil repellent, said process comprising treating said substrate with the product resulting from the admixture of an alkyl polysiloxane fluid, an acid selected from the group consisting of sulfuric acid, phosphoric acid, aromatic sulfonic acids, aliphatic sulfonic acids and hydrochloric acid; hydrofluoric acid, and a solvent.

19. The process as defined in claim 18 wherein said alkyl polysiloxane has the general formula:

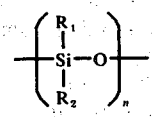

wherein $n$ is an integer greater than 1, $R_1$ is a lower alkyl radical containing from 1 to 7 carbon atoms, and $R_2$ is selected from the group consisting of hydrogen, a lower alkyl radical containing from 1 to 7 carbon atoms and an aryl radical.

20. The process defined in claim 19 wherein said alkyl polysiloxane is selected from the group consisting of a dimethyl polysiloxane, a methylhydrogen polysiloxane, methylphenylpolysiloxane and blends thereof.

21. The process defined in claim 19 wherein said acid is sulfuric acid.

22. The process defined in claim 19 wherein said solvent is isopropyl alcohol.

23. The process defined in claim 21 wherein said sulfuric acid is concentrated sulfuric acid.

24. The process defined in claim 23 wherein said alkyl polysiloxane is a dimethylpolysiloxane, and said solvent is isopropyl alcohol.

25. The process defined in claim 24 wherein said dimethylpolysiloxane is a blend of different viscosity dimethylpolysiloxanes.

26. A process for rendering a non-porous substrate water and soil repellent, said process comprising treating said substrate with a composition comprising an alkyl polysiloxane fluid; an acid selected from the group consisting of sulfuric acid, phosphoric acid, an aromatic sulfonic acid, an aliphatic sulfonic acid and hydrochloric acid; hydrofluoric acid and a solvent.

27. The process defined in claim 26 wherein said alkyl polysiloxane has the general formula:

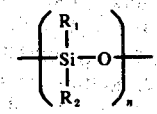

wherein $n$ is an integer greater than 1, $R_1$ is a lower alkyl radical containing from 1 to 7 carbon atoms and $R_2$ is selected from the group consisting of hydrogen, a lower alkyl radical containing from 1 to 7 carbon atoms and an aryl radical.

28. The process defined in claim 27 wherein said acid is sulfuric acid.

29. The process defined in claim 27 wherein said solvent is isopropyl alcohol.

30. The process defined in claim 27 wherein said alkyl polysiloxane is a dimethylpolysiloxane, said acid is concentrated sulfuric acid, and said solvent is isopropyl alcohol.

31. The process defined in claim 30 wherein said dimethylpolysiloxane is a blend of different viscosity dimethylpolysiloxanes.

32. A process for preparing a water and soil repellent composition, said method comprising admixing an alkyl polysiloxane fluid and a solvent and then adding to the resultant admixture an acid selected from the group consisting of sulfuric acid, phosphoric acid, an aromatic sulfonic acid an aliphatic sulfonic acid and hydrochloric acid; and hydrofluoric acid.

33. The process defined in claim 32 wherein said alkyl polysiloxane has the general formula:

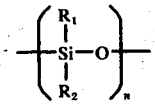

wherein $n$ is an integer greater than 1, $R_1$ is a lower alkyl radical containing from 1 to 7 carbon atoms and $R_2$ is selected from the group consisting of hydrogen, a lower alkyl radical containing from 1 to 7 carbon atoms and an aryl radical.

34. The process defined in claim 33 wherein said acid is sulfuric acid and said solvent is isopropyl alcohol.

35. The process defined in claim 33 wherein said alkyl polysiloxane is a dimethylpolysiloxane, said acid is concentrated sulfuric acid, and said solvent is isopropyl alcohol.

36. The process defined in claim 35 wherein said dimethylpolysiloxane is a blend of different viscosity dimethylpolysiloxanes.

37. The composition as defined in claim 1 wherein said alkyl polysiloxane fluid is a trimethylsiloxy chain-stopped dimethylpolysiloxane fluid.

38. The composition as defined in claim 1 wherein said acid selected from the group consisting of sulfuric acid, phosphoric acid, and aromatic sulfonic acid, an aliphatic sulfonic acid and hydrochloric acid is used in an amount comprising from about 1.0 to about 50% by weight of the amount of alkyl polysiloxane used and said hydrofluoric acid is used in an amount comprising from about 0.3% to about 30% by weight of the amount of alkyl polysiloxane used.

39. The composition defined in claim 1 wherein said acid selected from the group consisting of sulfuric acid, phosphoric acid, an aromatic sulfonic acid, an aliphatic sulfonic acid and hydrochloric acid is used in an amount comprising from about 1.0 to about 30% by weight of the amount of alkyl polysiloxane used and said hydrofluoric acid is used in an amount comprising from about 0.3 to about 10% by weight of the amount of alkyl polysiloxane used.

40. The composition as defined in claim 9 wherein said blend of different viscosity dimethylpolysiloxanes is a fluid of different viscosity trimethylsiloxy chain-stopped dimethylpolysiloxanes.

* * * * *

UNITED STATES PATENT AND TRADEMARK OFFICE
CERTIFICATE OF CORRECTION

PATENT NO. : 3,998,643
DATED : December 21, 1976
INVENTOR(S) : Raymond Liddle

It is certified that error appears in the above—identified patent and that said Letters Patent are hereby corrected as shown below:

Claim 8, line 3, "mineral" should be deleted.

Claim 38, line 3, "and" should read --an--.

Signed and Sealed this

Nineteenth Day of April 1977

[SEAL]

Attest:

RUTH C. MASON
Attesting Officer

C. MARSHALL DANN
Commissioner of Patents and Trademarks